O. S. PULLIAM.
ANTISKID DEVICE.
APPLICATION FILED JULY 12, 1919.
1,391,342.
Patented Sept. 20, 1921.
2 SHEETS—SHEET 1.
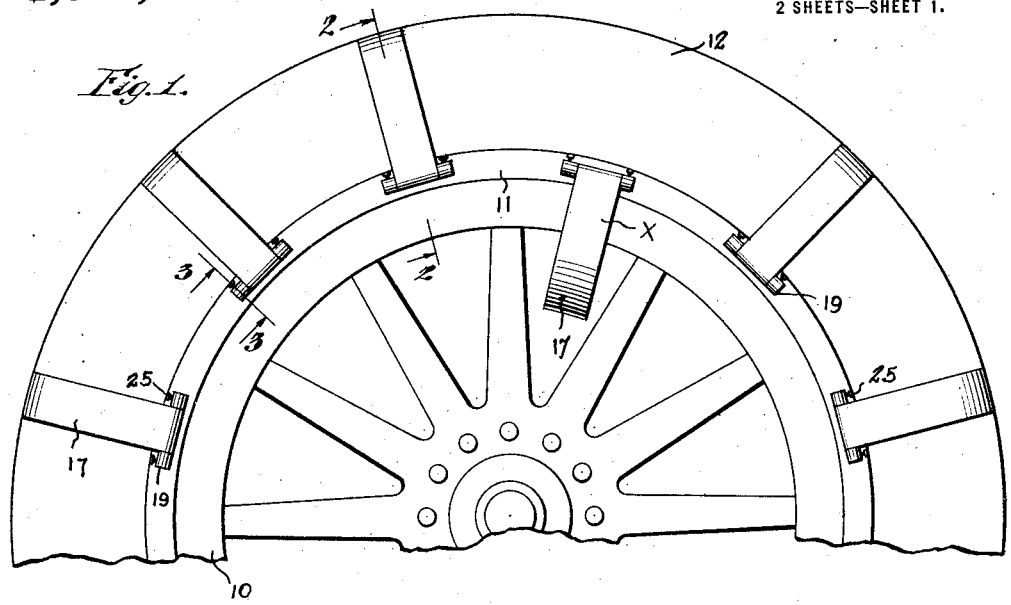
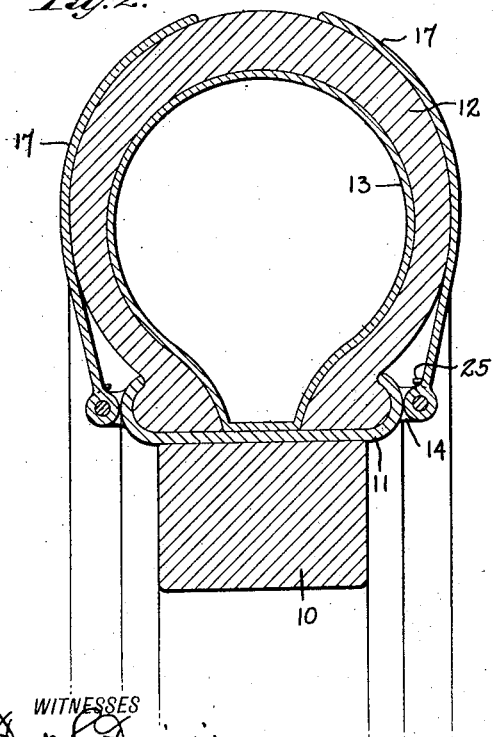
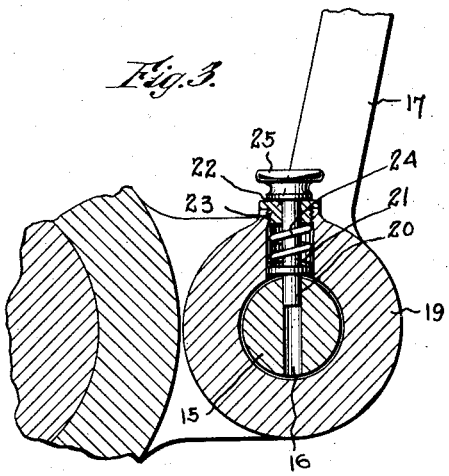
INVENTOR
O. S. Pulliam,
BY Munn & Co
ATTORNEYS O. S. PULLIAM.
ANTISKID DEVICE.
APPLICATION FILED JULY 12, 1919.
1,391,342.
Patented Sept. 20, 1921.
2 SHEETS—SHEET 2.
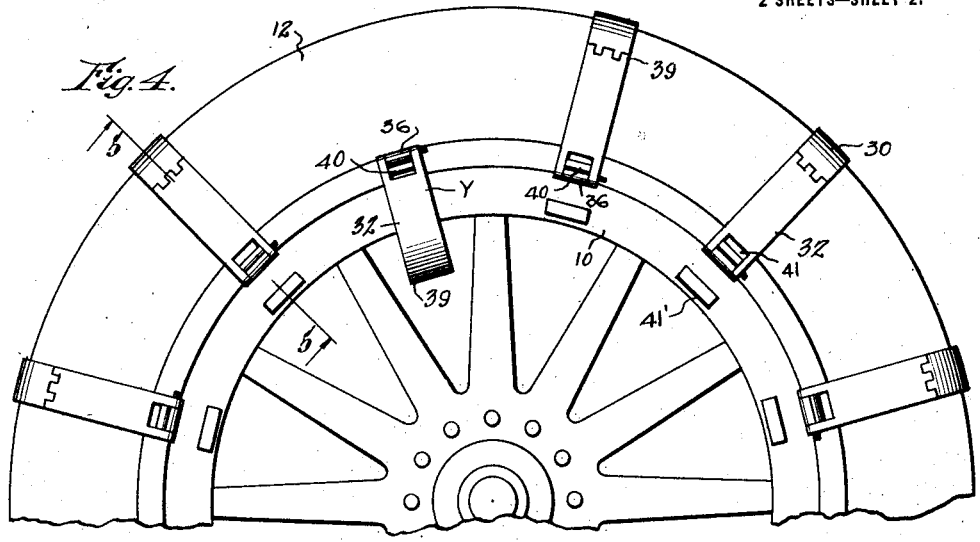
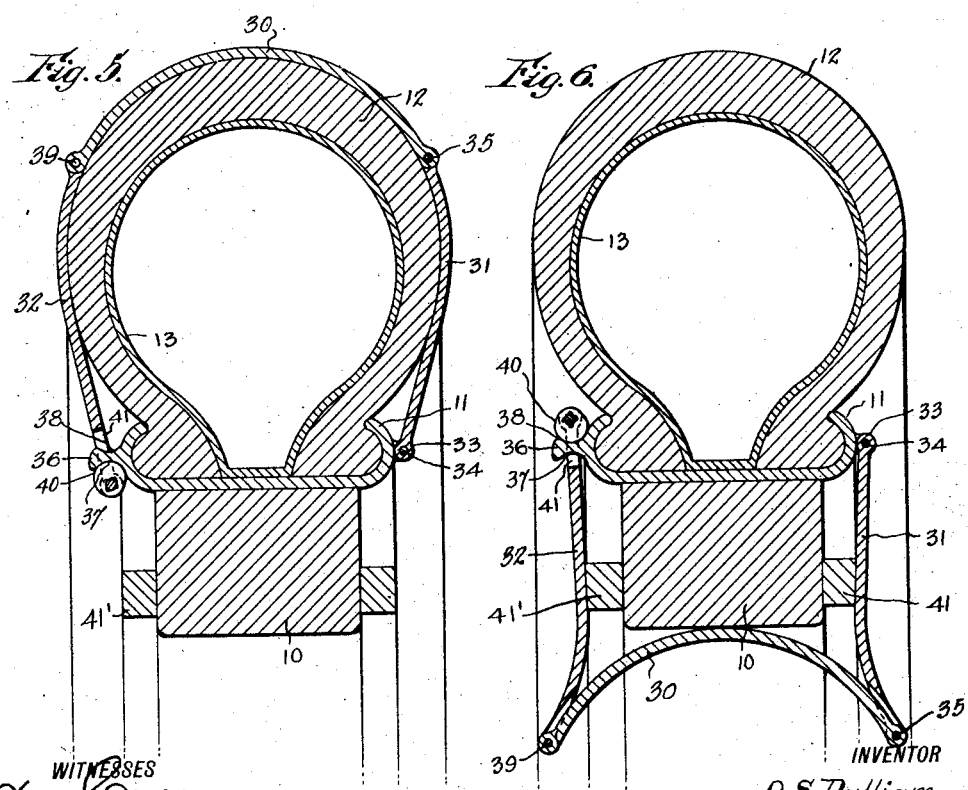
WITNESSES
INVENTOR
O. S. Pulliam,
BY
ATTORNEYS

UNITED STATES PATENT OFFICE.

OSWALD S. PULLIAM, OF NEW YORK, N. Y.

ANTISKID DEVICE.

1,391,342.      Specification of Letters Patent.      Patented Sept. 20, 1921.

Application filed July 12, 1919. Serial No. 310,324.

*To all whom it may concern:*

Be it known that I, OSWALD S. PULLIAM, a citizen of the United States, and a resident of the city of New York, borough of Manhattan, in the county and State of New York, have invented a new and Improved Antiskid Device, of which the following is a full, clear, and exact description.

The present invention relates to new and useful improvements in anti-skid devices particularly adapted for use with wheels of motor vehicles.

The primary object of the invention is to provide a device of this character which is permanently attached to the wheel and is movable into and out of operative position with the tire or traction surface of the wheel.

Another object of the invention is to provide means by which the traction increasing elements are locked against movement in both their operative and inoperative positions.

A further object of the invention is to provide a device of this character which is capable for use in connection with pneumatic tires without in any manner injuring the tires.

With the above and other objects in view, reference is had to the accompanying drawings in which Figure 1 is a fragmentary side elevation of an automobile wheel equipped with a device constructed in accordance with the present invention;

Fig. 2 is a vertical sectional view taken on the line 2—2 of Fig. 1;

Fig. 3 is a detail sectional view taken on the line 3—3 of Fig. 1;

Fig. 4 is a fragmentary side elevation of a wheel equipped with a device constructed in accordance with a modified form of the invention;

Fig. 5 is a sectional view on the line 5—5 of Fig. 4, showing the traction increasing members in their operative position, and Fig. 6 is a similar view showing the traction increasing members in their inoperative position.

Referring more particularly to the drawings, the reference numeral 10 designates a wheel, and 11 designates a channel or rim carried thereby, said channel serving for securing the casing 12, together with its tube 13, in place on the wheel. The channel 11 is provided on its opposite sides with a plurality of spaced lugs 14, and bridging each pair of lugs 14, is a rigid shaft or pintle 15, said pintle being provided with a suitable slot or opening 16, which passes diametrically therethrough.

The reference character 17 designates the anti-skid elements. Each of said elements comprises a resilient steel strip, as best shown in Fig. 1, said strip being so constructed that its outer free portion conforms to the shape of the casing 12. As shown in Fig. 3, this anti-skid element is provided with a bearing 19 on its inner end, and said bearing is adapted to receive the shaft or pintle 15 to serve the means for pivotally mounting said anti-skid element 17 to the channel 11 of the wheel 10.

Carried by each of the bearing members 19 is a sliding bolt 20, said bolt being provided with a washer 21. The bolts 20 are each slidably mounted in a bearing 22, which is threaded, as at 23, into the bearing 19, and interposed between said bearing 22 and the washer 21, is a coil spring 24, by means of which the free end of the bolt is maintained in engagement with the opening 16 of the shaft or pintle 15. Each of these sliding bolts 20 is provided with an operating knob 25, by means of which it is reciprocated in the bearing member 22. By this construction, it will be seen that when the anti-skid elements 17 are engaged with the tire casing 12, as shown in Fig. 2, the sliding bolts 20 are adapted to engage the outer side of the slots or openings 16 to maintain the anti-skid elements in the position shown in said figure.

As shown at X in Fig. 1, the anti-skid elements are adapted to fold inwardly out of engagement with the tire and lie between the spokes of the wheel, and when in this position, the sliding bolts 20 are adapted to engage the inner end of the slots or openings 16 to maintain the anti-skid elements in their inoperative position.

In the form of the invention shown in Figs. 4 to 6, inclusive, the anti-skid elements comprise flexible sheet metal members 30, which are arcuate and are adapted to conform in shape to the tread portion of the casing 12. Pivotally secured to each end of the anti-skid elements 30 are links 31 and 32. The link 31 is pivotally secured to the channel member 11, by means of lugs 33, and a pintle 34, said link being pivotally connected to the anti-skid elements 30 by means of a pintle or the like 35. The opposite side of the channel member 11 is provided at a point opposite the lugs 33, with a projecting lug 36, and said projecting lug 36 is provided with an inner curved seat 37 and an outer curved seat 38, the purpose of which will be hereinafter described. The link 32 is pivotally secured as at 39, to the anti-skid elements 30, and mounted in the free end of said link 32 is a cam member 40. The link 32 is further provided with an opening 41, which is adapted to receive the lug 36 in a manner to be hereinafter set forth.

In this form of the invention, when the anti-skid elements 30 are desired for use, the same are positioned about the tread of the tire as shown in Fig. 5. The cam member 40 engages the inner curved side 37 of the lug 36, thus serving to maintain the anti-skid elements 30 in engagement with the tire. When, however, it is desired to remove the anti-skid elements 30 from their operative position, as shown in Fig. 6, the anti-skid elements 30 are engaged with the inner face of the wheel 10, and the cam member 40 is engaged with the outer curved seat 38 of the lug 36, in order to tighten the lugs 31 and 32 and the anti-skid elements against the rim of the tire. In order to prevent rattling of the parts when in this position, suitable strips 41' of rubber or the like, are interposed between the links 31 and 32 and the wheel 10.

From the foregoing, it will be apparent that the present invention provides anti-skid devices for pneumatic tires which are at all times carried by the wheel, and which are capable of being secured in both their operative and inoperative positions.

Having thus described the invention, what is claimed is:

1. A device of the character described comprising in combination, a wheel, a rim, a plurality of anti-skid devices carried by said rim and adapted for movement into operative position in engagement with the tread of said tire, and out of operative position out of engagement with the tread of the tire, and a sliding bolt for locking said anti-skid elements in both their operative and inoperative positions.

2. In combination with a wheel, a plurality of anti-skid elements carried by the wheel and adapted to occupy an operative position transverse the tread of the wheel and an inoperative position within the confines of the wheel, a bolt forming the pivotal support for each of said anti-skid elements, said bolt having an opening extending therethrough, and means carried by each of said anti-skid elements and adapted to be received in one end of the opening in its respective bolt to secure the anti-skid element in one position and engage the opposite end of said opening to lock the anti-skid element in the inoperative position.

OSWALD S. PULLIAM.